United States Patent
Kowald (10) Patent No.: US 10,480,784 B2
(45) Date of Patent: Nov. 19, 2019

(54) INLET SCREEN ASSEMBLY FOR ULTRA LOW NOX GAS-AIR MIXING SYSTEM

(71) Applicant: Lennox Industries Inc., Richardson, TX (US)

(72) Inventor: Glenn W. Kowald, Carrollton, TX (US)

(73) Assignee: Lennox Industries Inc., Richardson, TX (US)

( * ) Notice: Subject to any disclaimer, the term of this patent is extended or adjusted under 35 U.S.C. 154(b) by 161 days.

(21) Appl. No.: 15/674,313

(22) Filed: Aug. 10, 2017

(65) Prior Publication Data
US 2019/0049110 A1  Feb. 14, 2019

(51) Int. Cl.
*B01D 46/00* (2006.01)
*F23D 14/68* (2006.01)
*B01D 39/12* (2006.01)
*F24H 9/20* (2006.01)
*B01D 46/10* (2006.01)

(52) U.S. Cl.
CPC ............. *F23D 14/68* (2013.01); *B01D 39/12* (2013.01); *B01D 46/0005* (2013.01); *F24H 9/2085* (2013.01); *B01D 46/103* (2013.01); *B01D 2275/10* (2013.01)

(58) Field of Classification Search
CPC ... F23D 14/68; F24H 9/2085; B01D 46/0005; B01D 46/103; B01D 39/12; B01D 2275/10
USPC .............................. 55/490, 505, 511; 96/380
See application file for complete search history.

(56) References Cited

U.S. PATENT DOCUMENTS

| | | | |
|---|---|---|---|
| 2,271,733 A * | 2/1942 | Clark | F23L 1/00 454/271 |
| 3,443,365 A * | 5/1969 | Lee | B01D 35/143 116/272 |
| 3,722,186 A * | 3/1973 | Parker | F02M 35/04 55/304 |
| 5,385,299 A * | 1/1995 | Zawada | F24B 5/021 126/110 R |
| 5,545,241 A * | 8/1996 | Vanderauwera | B01D 46/0004 55/490 |
| 5,891,207 A * | 4/1999 | Katta | B01D 46/0002 55/385.3 |
| 6,183,544 B1 * | 2/2001 | Ormond | B01D 46/2411 55/310 |
| 7,462,220 B2 * | 12/2008 | Farmer | F02C 7/05 55/DIG. 34 |
| 8,192,623 B2 * | 6/2012 | Reid | B01D 29/012 210/335 |
| 2012/0178031 A1 * | 7/2012 | Roy | F23D 14/62 431/12 |
| 2012/0323377 A1 * | 12/2012 | Hoglund | F24F 11/30 700/277 |

(Continued)

*Primary Examiner* — Frank M Lawrence, Jr.
(74) *Attorney, Agent, or Firm* — Baker Botts L.L.P.

(57) ABSTRACT

Systems and methods are described for a screen assembly for gas-air mixers in HVAC systems, such as for furnaces. A screen assembly can comprise a mesh screen, a housing, and a pressure tap. The mesh screen can allow for the intake of an air supply while also blocking unwanted foreign matter such as dust or leaves. The housing can receive the air supply and direct it into a gas-air mixer or other component. The pressure tap can be coupled to a gas valve or regulator in order to modulate the flow of gas when air flow is restricted.

8 Claims, 10 Drawing Sheets

(56) References Cited

U.S. PATENT DOCUMENTS

| | | | |
|---|---|---|---|
| 2013/0291500 A1* | 11/2013 | Rodabaugh | F02M 35/1216 55/462 |
| 2015/0362209 A1* | 12/2015 | Dolan | F24F 13/082 454/276 |
| 2016/0097553 A1* | 4/2016 | Brian | F24F 13/14 454/255 |

* cited by examiner

INLET SCREEN ASSEMBLY FOR ULTRA LOW NOX GAS-AIR MIXING SYSTEM

TECHNICAL FIELD

The present disclosure is directed to heating, ventilation and air conditioning systems (HVAC), and more particularly to air inlet screens and filters.

BACKGROUND OF THE INVENTION

HVAC systems can include premix burners, furnaces, and other components that combust a mix of fuel and air. Fuel is often provided by a utility hookup. Air is provided in such applications by an air inlet that usually pulls air from the atmosphere. Because air is drawn from the atmosphere, there is a risk of foreign matter being drawn into the air intake, the gas-air mixer, the premix burner, furnace heat exchanger or another component. Foreign matter such as dust, leaves, bugs or other things can be detrimental, causing mechanical failure or suboptimal operation.

BRIEF SUMMARY OF THE INVENTION

One possible embodiment under the present disclosure comprises a screen assembly for use with a gas-air mixer in an HVAC system comprising: a screen on one end of the screen assembly operable to receive a flow of air therethrough and operable to deflect at least one type of foreign matter; a housing comprising a screen portion and an outlet portion, the outlet portion operable to couple with the screen and hold it in place, the outlet portion configured to receive the flow of air and direct it to another component in the HVAC system; and a pressure tap coupled to the housing and configured to be pneumatically coupled to another location in the HVAC system.

Another possible embodiment under the present disclosure comprises a premix assembly for use with a furnace in an HVAC system comprising: a mixing chamber operable to mix a supply of air and a supply of gas and to provide a gas-air mix to another component in the HVAC system; a screen assembly coupled to the mixing chamber, operable to receive the supply of air from outside of the mixing chamber, and comprising: a screen on one end of the screen assembly operable to receive the supply of air therethrough and operable to deflect at least one type of foreign matter; a housing operable to couple with the screen and hold it in place, and configured to receive the supply of air and direct it into the mixing chamber; a pressure tap coupled to the housing and configured to be pneumatically coupled to another location in the HVAC system; and a gas valve configured to direct the supply of gas into the mixing chamber.

Another possible embodiment under the present disclosure comprises a method of manufacturing a screen assembly for use with a premix assembly in an HVAC system, comprising: providing a screen configured to receive a flow of air therethrough and to deflect at least one type of other matter; coupling the screen to a housing, the housing configured to receive the flow of air and direct it to another component in the HVAC system; and coupling a pressure tap to the housing, the pressure tap configured to be pneumatically coupled to another location in the HVAC system.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE INVENTION

Embodiments under the present disclosure can provide inlet screen assemblies for ultra low NOx gas-air mixing systems. While a preferred embodiment is a low NOx system, embodiments can comprise or be combined with other types of gas-air mixers, furnaces, or other components.

A gas-air mixer assembly should provide a homogeneous, proper ratio supply of gas (or fuel) and air mixture to a premix burner in a negative pressure heat exchanger system.

Foreign matter ingested into this system can result in a number of issues ranging from firing rate reduction, poor lighting, flame flashback, high emissions, noise, and poor combustion. Embodiments under the present disclosure can alleviate these problems through use of an inlet air screen assembly. The inlet air screen assembly can provide protection against the ingestion of foreign or other matter such as insulation, leaves, dust, insects and other contaminants. The screen is preferably designed to allow up to ⅔rds blockage before performance is affected. Embodiments of screen assemblies under the current disclosure can be easily disassembled for rapid cleaning. Screen pitch and materials can also be varied easily to fit specific applications. The design of the screen assembly can also allow for the application of additional filter materials such as foam, fiberglass, cloth, or others, if additional filtration is required. A screen assembly embodiment can also have an integral pressure tap to reduce part count and provide a method for connection to the gas valve and pressure switch for blocked filter protection.

Figure 1:
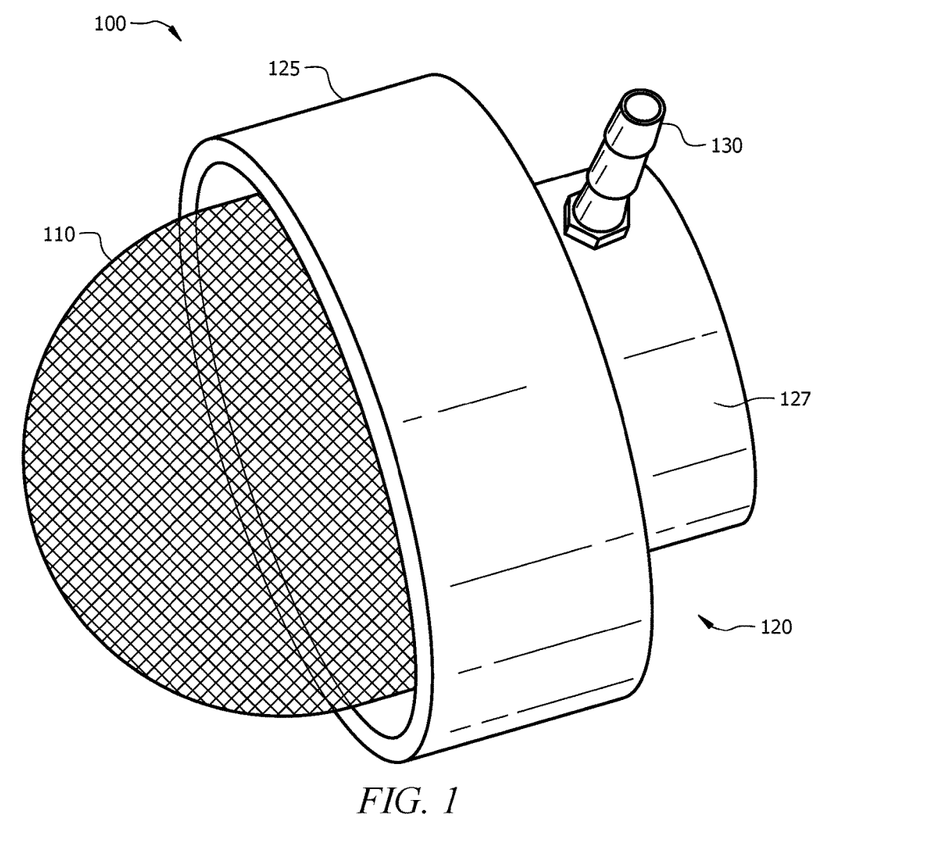
FIG. 1 is a diagram of a screen assembly embodiment under the present disclosure.
Figure 2:
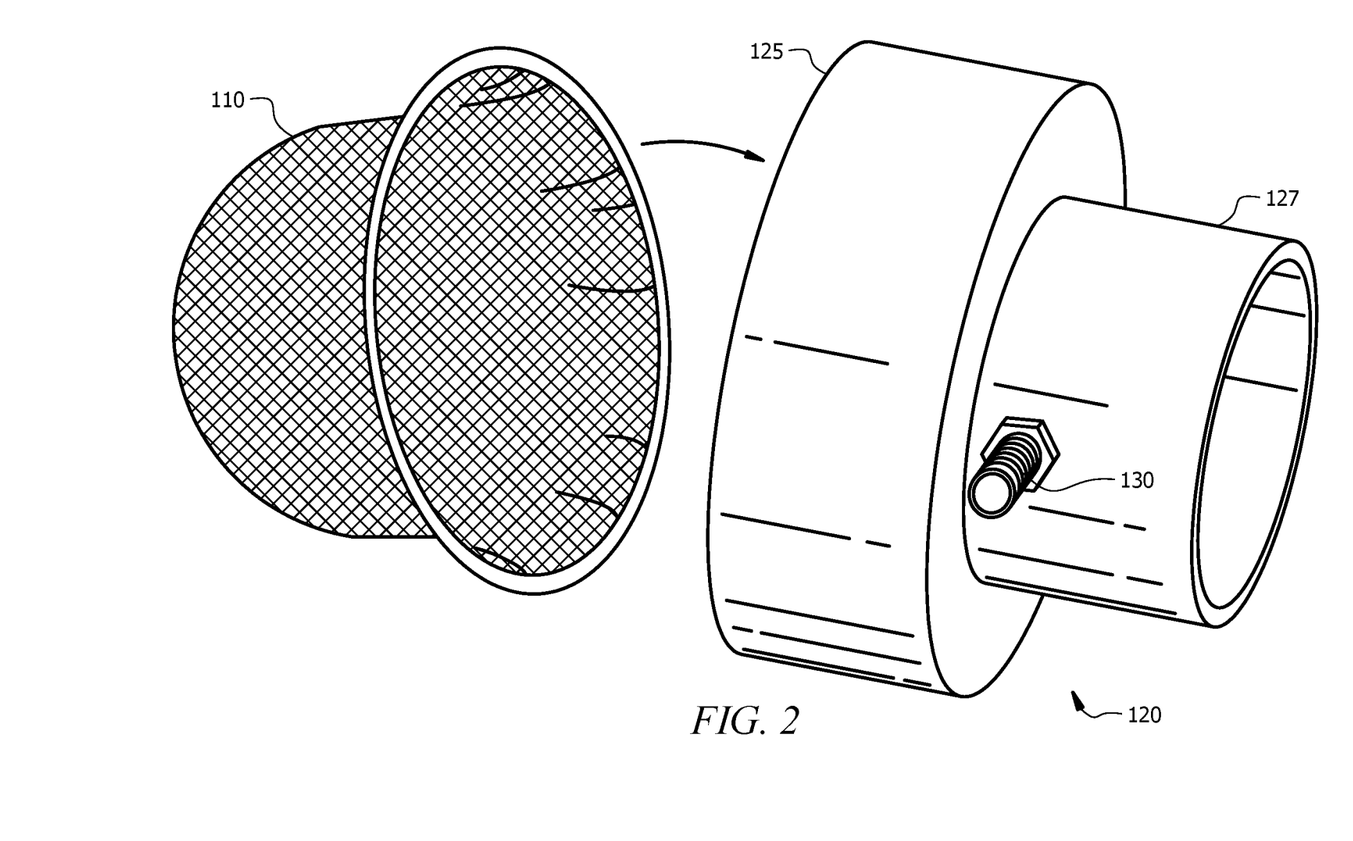
FIG. 2 is a diagram of a screen assembly embodiment under the present disclosure.

Referring to FIG. 1, an embodiment of a screen assembly 100 under the present disclosure can be described. Assembly 100 can be attached or inserted into a gas-air mixer as will be described further below. Assembly 100 comprises a screen 110, housing 120, and pressure tap 130. Housing 120 comprises a screen attachment portion 125 and an outlet portion 127. In this embodiment, a mixer will attach to, or receive, outlet portion 127. When the furnace or HVAC system comprising assembly 100 is functioning, air will enter through screen 110 and pass through portions 125, 127 and into the mixer for mixing with fuel/gas. Pressure tap 130 can comprise a connection to a pressure regulator or meter. While screen 110 can be removed for cleaning or replacement, the pressure tap 130 can remain in place, helping to ensure structural integrity. FIG. 2 displays the embodiment of FIG. 1 with the parts separated. Screen 110 can be removed from housing 120 for cleaning, replacement, or other actions.

FIGS. 1 and 2 display a preferred embodiment of screen assembly 100. However, various factors can be adjusted while still keeping within the teachings of the present disclosure. For example, screen 110 is preferably a metallic mesh. However, other materials can be used such as foams, textiles, ceramics, plastics, and more, as well as combinations of any of the foregoing. In addition, the weave or hole size and placement can be adjusted. If a wire mesh is used, then wire diameter, pitch and open area can all be adjusted. A preferred embodiment comprises a dome shape, such as in FIGS. 1 and 2. However, other shapes can be used. Benefits of a dome shape can include stable structural shape, increased surface area resulting in approximately ⅔ plugging before operation is affected, and less effect of plugging location on performance. Alternative embodiments can comprise different screen sizes and shapes to better filter specific foreign matter. Since the mesh is easily removable, these alternates could easily be offered as upgrades or retrofit solutions to specific field conditions when required. Replaceable filter materials (fiber, paper, foam, etc.) could be offered as an option. Alternate shapes could also be employed to affect combustion air flow potentially improving gas-air mixing and performance. Screen mesh size and pressure drop could be varied to help attenuate combustion resonance. Another alternate construction might add inlet effects to vary flow rate, improving mixing, or provide a method of variable restriction to increase pressure drop and modulate firing rate. Another alternate feature might incorporate a connection port for combustion resonance attenuation devices, such as a ¼ wave tube or Helmholtz resonator.

Housing 120 preferably comprises a composite material, such as some form of plastic, though various materials, or combinations, can be used. FIGS. 1 and 2 show a screen attachment portion 125 and an outlet portion 127 with different sizes and perimeters. However, various geometries can be used. Housing 120 could comprise a single long cylinder, or a square shape, or other shapes. Pressure tap 130 preferably comprises a metal material, but various materials or combinations can be used. Pressure tap 130 preferably is attached at outlet portion 127 but it could be attached to other parts of housing 120.

In the embodiment of FIGS. 1 and 2, the screen 110 is held in place by a slight preloading of the screen to the interior of screen attachment portion 125. Other options for attachment can include mechanical fasteners, clips, or adhesives. Disassembly of the screen does not require removal of the entire assembly for cleaning which was required on prior art systems. One advantage of this approach is quick, easy, complete cleaning of the screen without the potential for affecting other key parts. For instance, on other designs the entire assembly must be removed for cleaning resulting in the potential for affecting other components during the cleaning process. Opportunity for error is multiplied by removing the entire assembly that may result in unsafe operation.

Integration of the pressure tap in to the screen assembly can provide a fixed relationship between the screen and other system components by providing a predictable pressure signal response to changes in screen restriction. As the pressure tap is attached to the plastic part that is not removed during cleaning, the pressure hoses critical for safe operation remain in place eliminating the potential for error during re-assembly. The pressure tap can be pneumatically linked to other components in an HVAC system, such as a gas valve, or other parts of a premix combustion system or furnace. Pneumatically linking the pressure tap can include the use of pneumatic tubes, connectors, manifolds, couplings, or other means.

Figure 3:
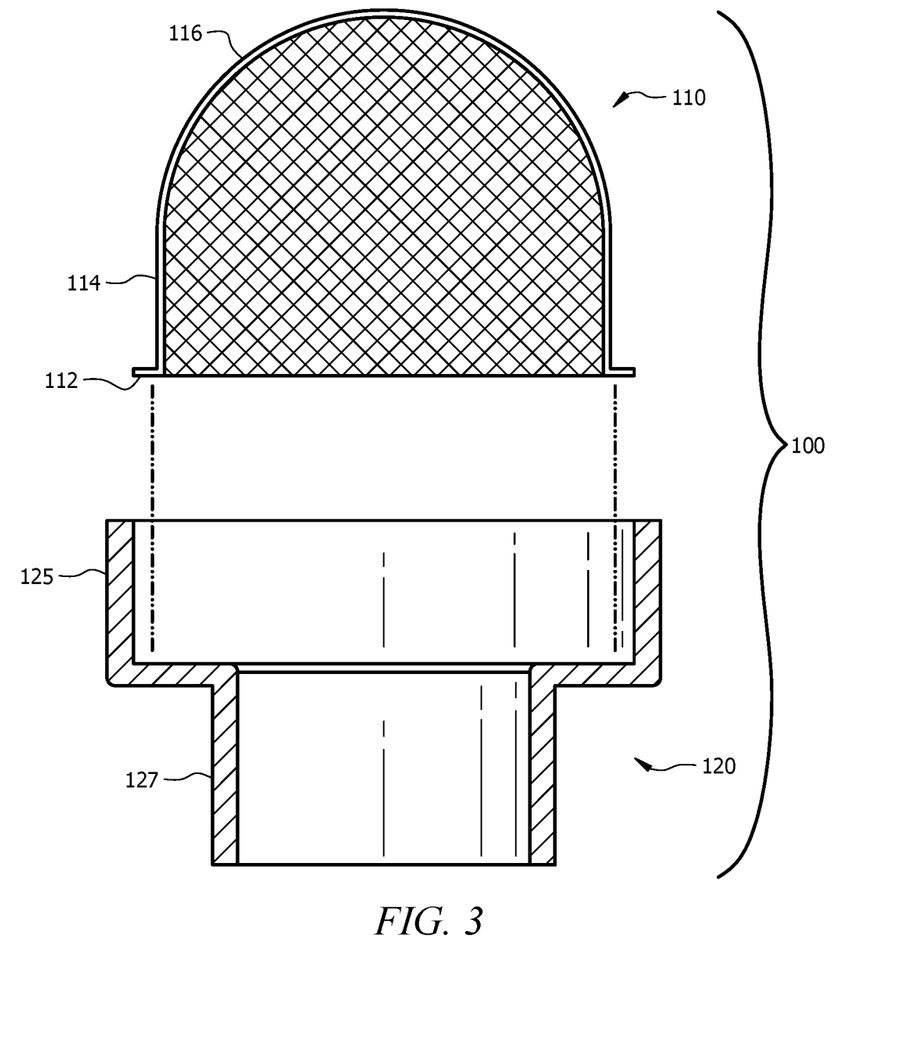
FIG. 3 is a diagram of a screen assembly embodiment under the present disclosure.

FIG. 3 shows a possible embodiment of a screen assembly under the present disclosure comprising screen 110 and housing 120 (with screen attachment portion 125 and outlet portion 127). FIG. 3 shows possible dimensions for several of these elements. A radius of a dome portion 116 of screen 110 can be 1.56 inches. An overlap portion 114 of the screen can comprise the portion of the screen that will sit below the rim of screen attachment portion 125. In certain embodiments, the overlap can be 1 inch long, though other dimensions are well within the scope of the concepts described herein. In certain embodiments, a tab 112 for fitting the screen 110 into the housing 120 can measure 0.22 inches. This tab 112 can be of an interference fit for preloading by pressure into the screen attachment portion 125.

Figure 4:
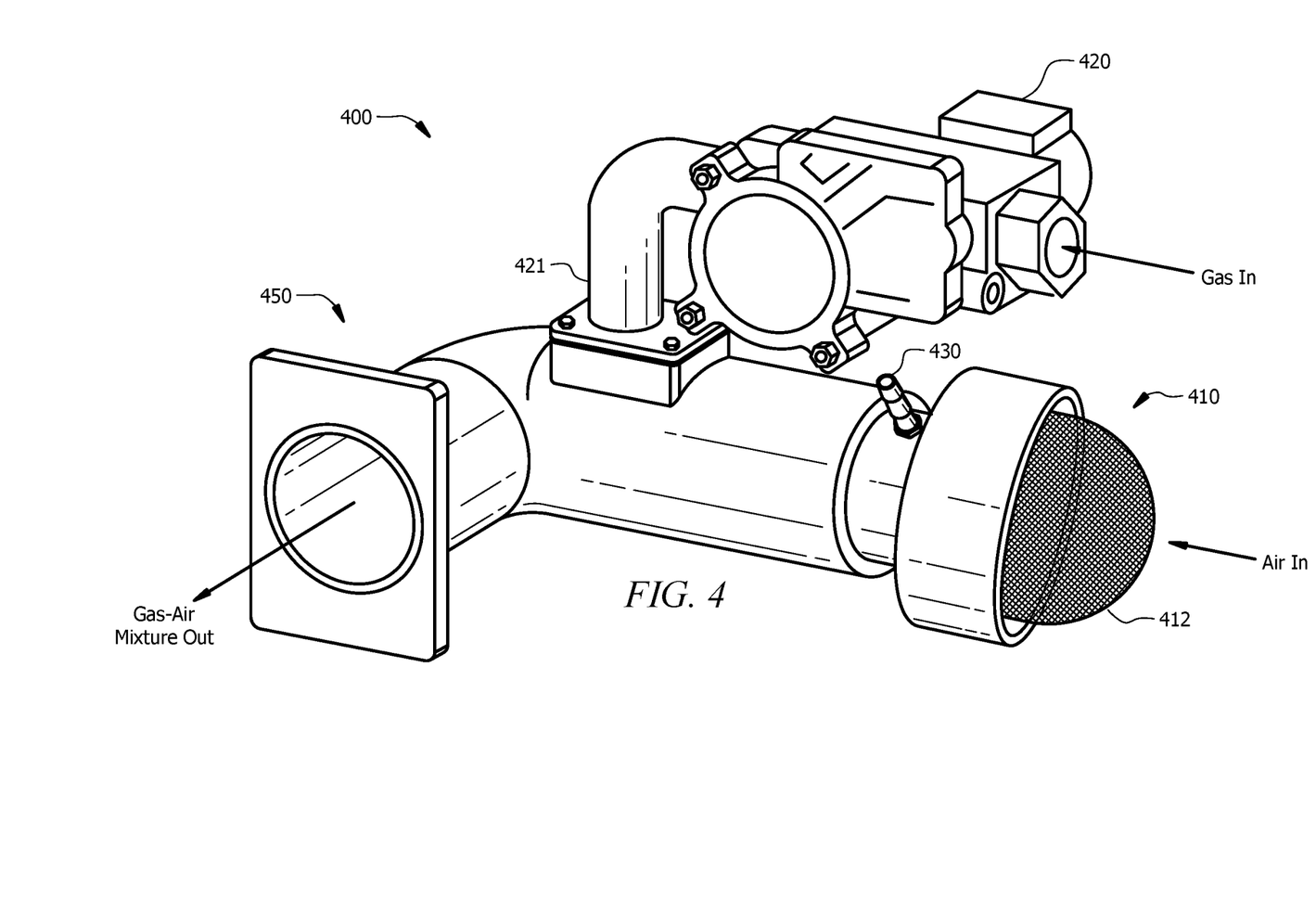
FIG. 4 is a diagram of a gas-air mixer assembly embodiment under the present disclosure.
Figure 5A:
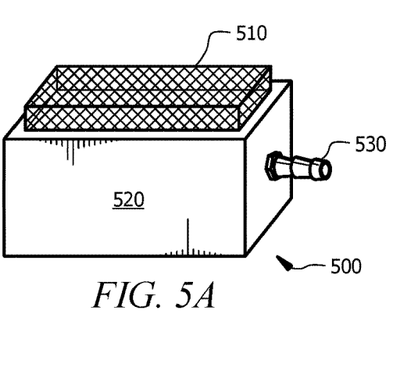
FIG. 5A-5B are diagrams of a screen assembly embodiment under the present disclosure.
Figure 5B:
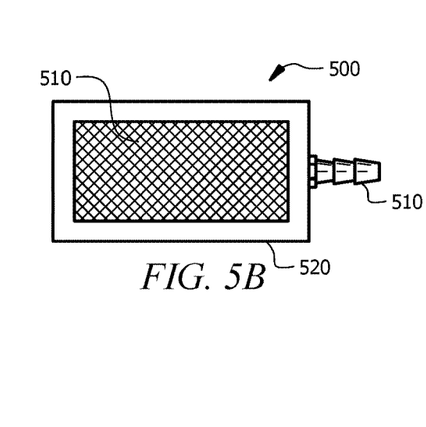
Figure 6A:
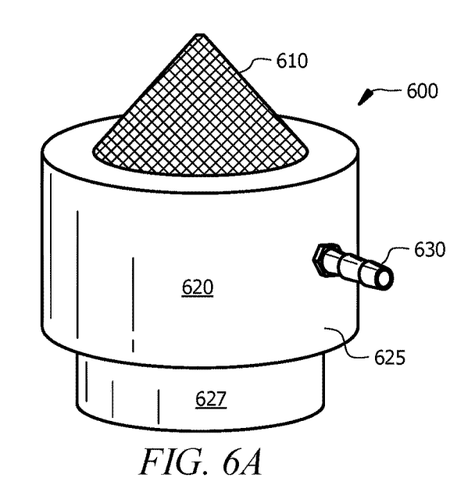
FIG. 6A-6B are diagrams of a screen assembly embodiment under the present disclosure.
Figure 6B:
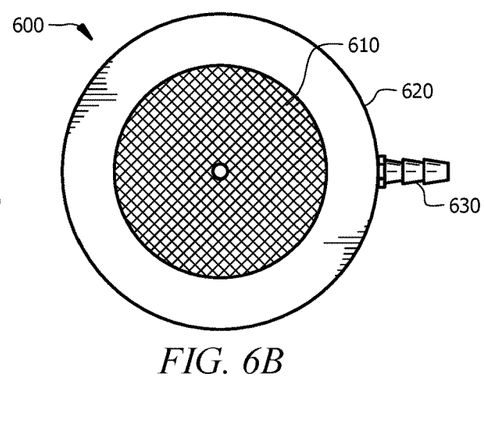
Figure 7A:
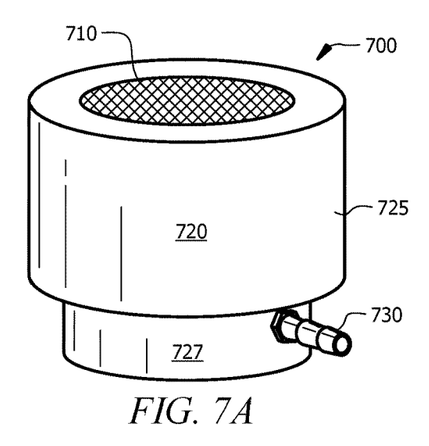
FIG. 7A-7B are diagrams of a screen assembly embodiment under the present disclosure.
Figure 7B:
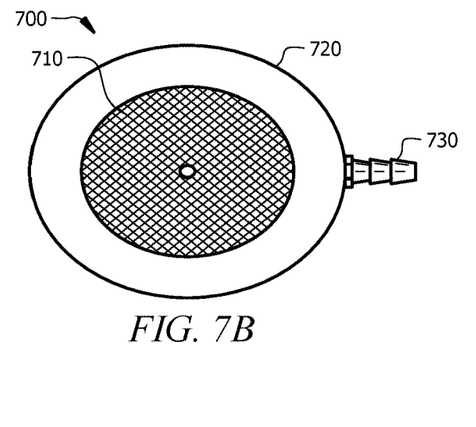

FIG. 4 displays an embodiment of a gas-air mixer 400 comprising a screen assembly embodiment 410 as described in the present disclosure. In this embodiment, mixer 400 has an elbow shape, but other shapes are possible. Screen assembly 410 provides air to the mixer body 450. Gas valve 420 provides gas via gas connection 421. Pressure tap 430 can provide pressure measurement or pneumatic regulation via a connection tube (not shown) to another component. Gas and air will mix in the mixer body 450 and then exit the body 450 for delivery to another component, such as a burner or combustion chamber. In a preferred embodiment, the size of the screen 412 will be three times the surface area as the end of the mixer body 450. Bigger and smaller size screens can be used in other embodiments. Pressure tap 430 can be pneumatically linked to the gas valve or to a regulator connected to the gas valve. If air flow drops for some reason, such as a blockage, then the pneumatic signal from pressure tap 430 can cause the gas flow to drop or turn off.

FIGS. 5A-7B show various embodiments of screen assemblies 500-700. These embodiments help to show that the present disclosure is not limited to a single screen size, shape, geometry, or style. Assembly 500 comprises a rectangle shape housing 520 and screen 510. Housing 520 comprises a single portion (not a dual portion setup such as in FIGS. 1 and 2). Pressure tap 530 is connected to housing 520. Embodiment 600 comprises dual portions 625 and 627 like FIGS. 1-2, but has a cylinder-shaped housing 620 and a triangular cone shaped screen 610. Pressure tap 630 is connected to the screen attachment portion 625. Embodiment 700 comprises a dual portion setup, with a screen attachment portion 725 and an outlet portion 727 of the housing 720. Screen 710 does not stick out from the housing 720 but is flush with the surface. Embodiments 500, 600, and 700 are non-limiting possible embodiments under the present disclosure.

Figure 8:
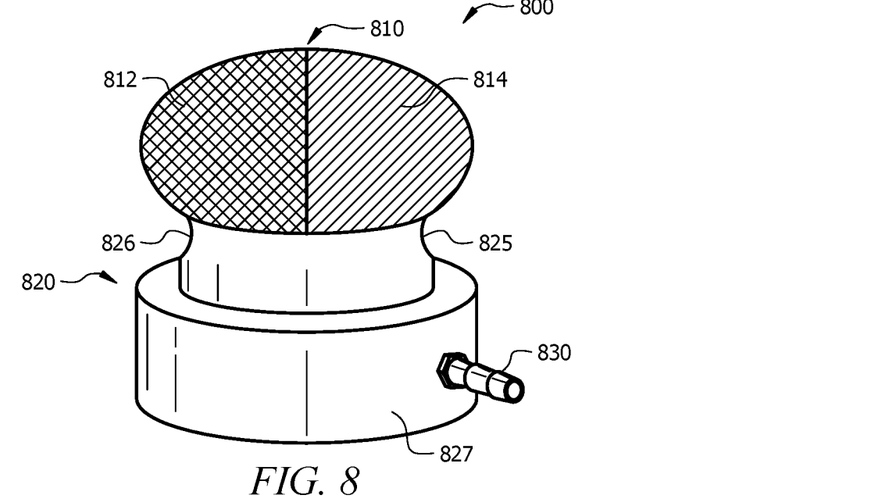
FIG. 8 is a diagram of a screen assembly embodiment under the present disclosure.
Figure 9:
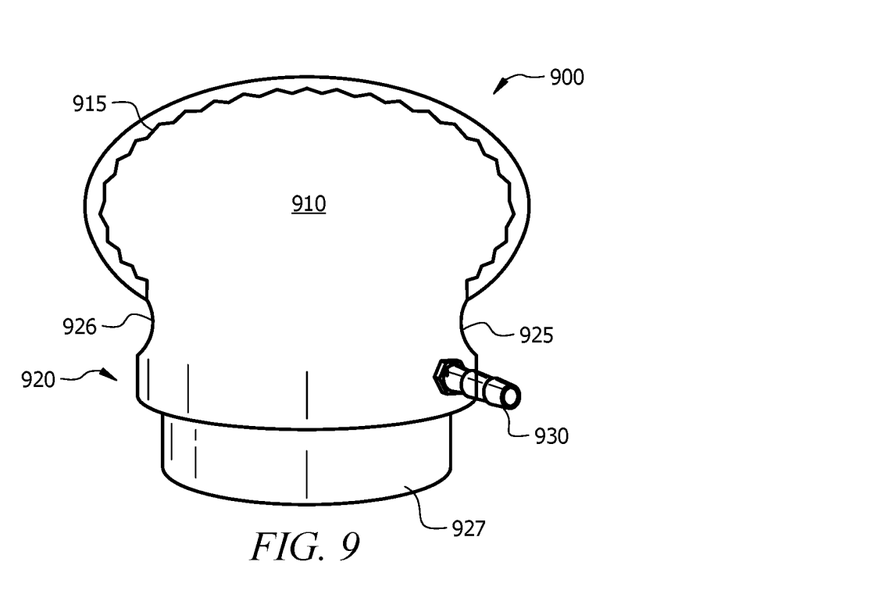
FIG. 9 is a diagram of a screen assembly embodiment under the present disclosure.

FIGS. 8 and 9 display further possible embodiments under the present disclosure. Embodiment 800 displays a screen 810 that comprises a mesh screen 812 on one portion and a solid material 814 on the other. Such an embodiment may cause a desirable flow in certain embodiments. While the embodiment of FIG. 8 shows a half-covered screen 810, other shapes of solid portion 814 can be employed. Patterns such as checkerboards, spirals, or other patterns can be used. FIG. 9 shows a screen assembly 900 with a screen 910 with an interior treatment or inner mesh 915. Treatment or mesh 915 can comprise an additional screen added to screen 910, or it can comprise an interior treatment such as a sound deadening material in a porous or mesh configuration. Embodiments 800 and 900 show various configurations of screen attachment portions 825, 925, outlet portions 827, 927, housing 820, 920, and pressure tap 830, 930. Preloaded portions 826 and 926 can be portions of the screens 810, 910 that are preloaded to be coupled into housings 820, 920.

Figure 10:
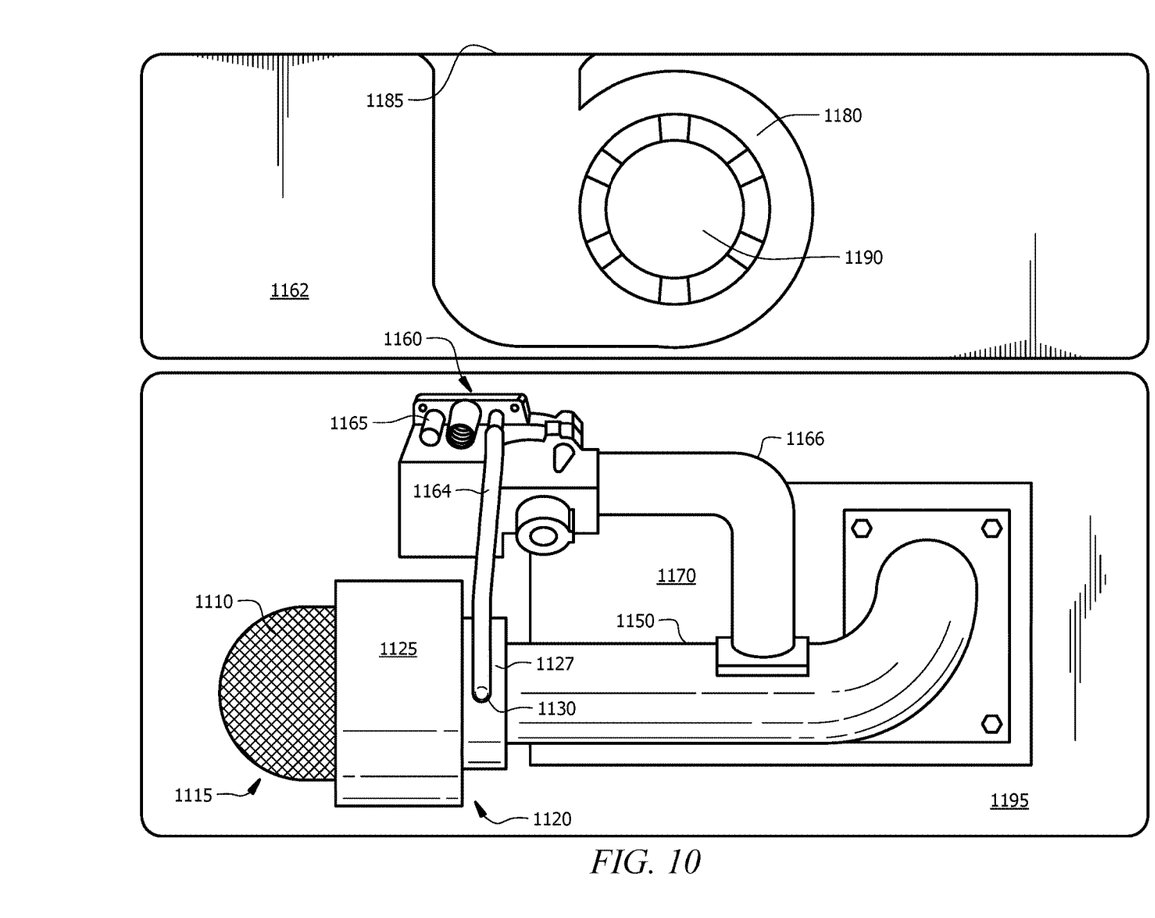
FIG. 10 is a diagram of a furnace assembly embodiment under the present disclosure.
Figure 11:
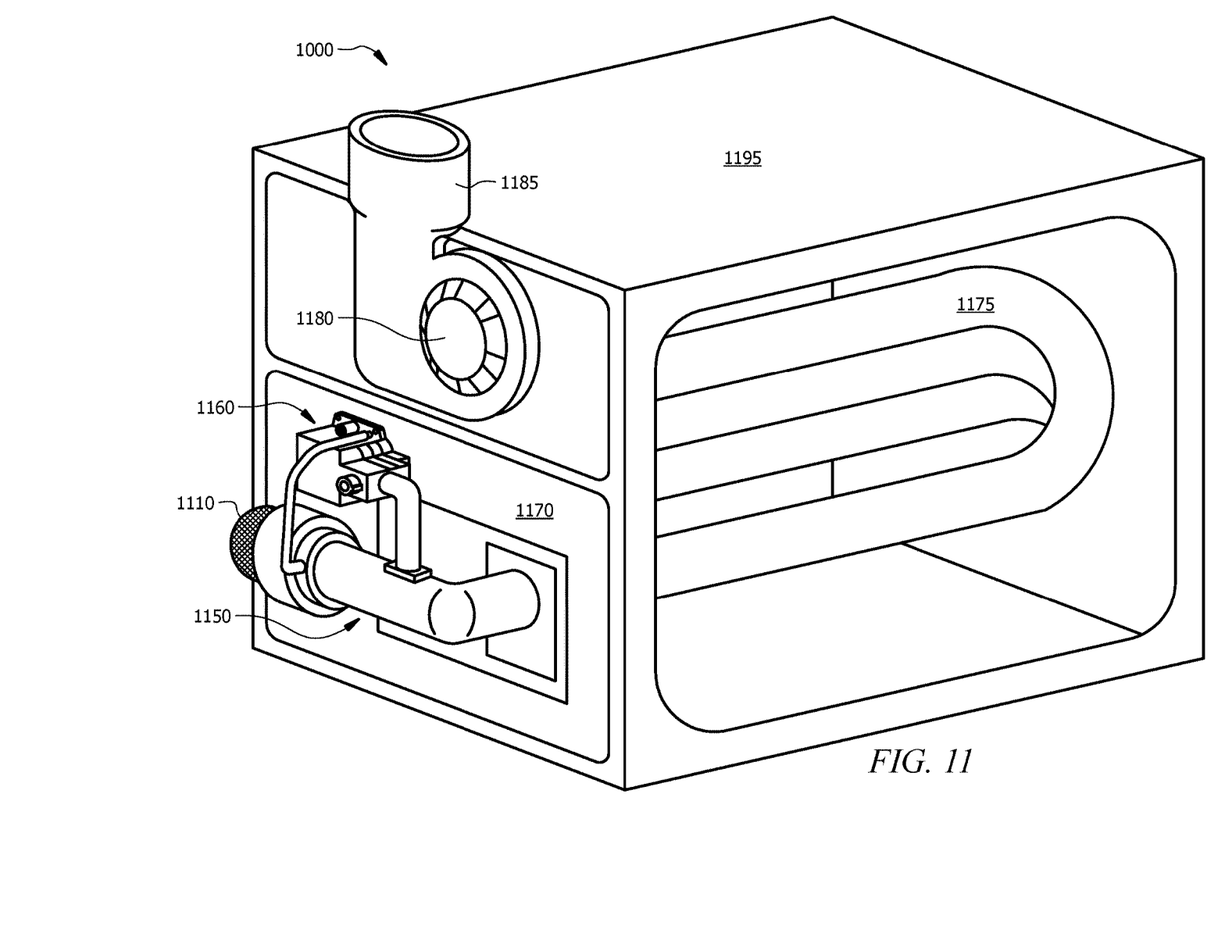
FIG. 11 is a diagram of a furnace assembly embodiment under the present disclosure.

FIG. 10 displays an embodiment of a furnace cabinet under the present disclosure. Embodiment 1000 comprises a cabinet 1195 with a gas-air mixer 1150, combustion chamber 1170, inducer fan 1180 and a gas valve 1160. Screen assembly 1110 comprises a screen 1115, housing 1120 (with screen attachment portion 1125 and outlet portion 1127), and a pressure tap 1130. Pressure tap is pneumatically coupled to the gas valve 1160 by connection tube 1164. Gas valve 1160 comprises a port 1165 for pneumatic linkage with gas-air mixer pressure or for connection to another part of the system. Inlet connection 1166 provides a path for gas to enter the mixing chamber 1150 for mixing with air. Gas is provided to the gas valve from a utility hookup via connection tube 1162. Controller 1190 can connect to inducer fan 1180, gas valve 1160, or other parts of the system. Inducer fan helps to pull combusted matter through the heat exchanger (not shown). Exhaust 1185 provides a pathway out of the system to an exhaust vent or elsewhere. FIG. 11 shows the embodiment 1100 of FIG. 10 from a side view. Here, the heat exchanger tubes 1175 can be seen. A variety of heat exchanger sizes, shapes and styles can be used with the current disclosure, such as clam shells, and more.

Figure 12:
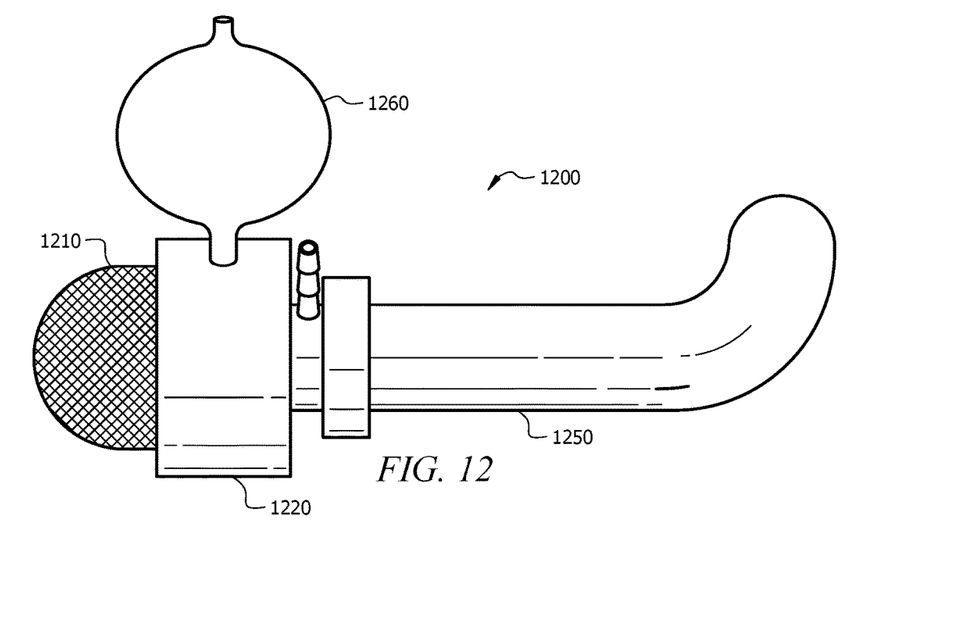
FIG. 12 is a diagram of a gas-air mixer assembly embodiment under the present disclosure.
Figure 13:
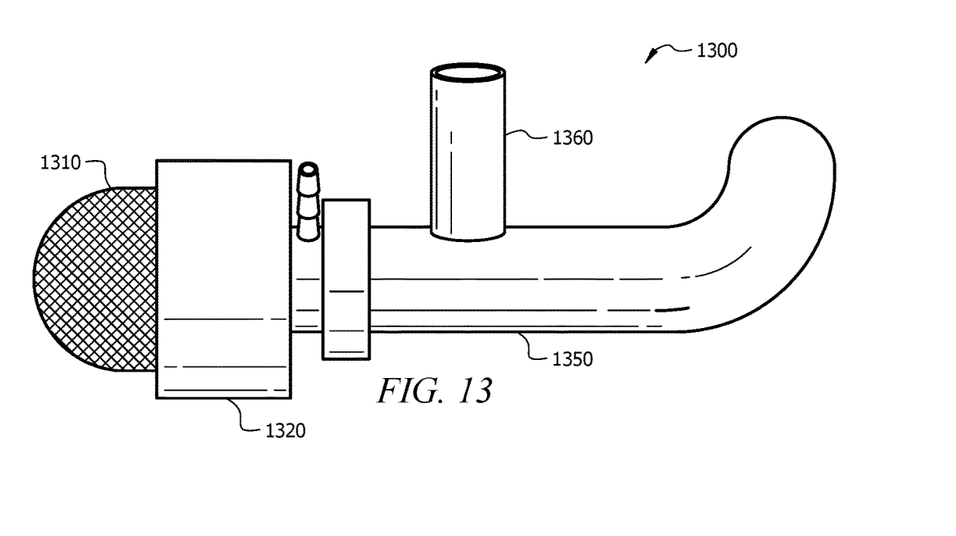
FIG. 13 is a diagram of a gas-air mixer assembly embodiment under the present disclosure.

FIG. 12 displays an embodiment under the present disclosure of a gas-air mixer with a Helmholtz resonator 1260. The resonator 1260 can be coupled to the housing 1220 or along the mixing chamber 1250. A Helmholtz resonator 1260 can be used to help attenuate noise with the system. FIG. 13 displays an embodiment under the present disclosure with a quarter wave tube 1360. A quarter wave tube, like a Helmholtz resonator, can be used to attenuate or deaden noise within the system. A Helmholtz resonator 1260 or quarter wave tube 1360 can be coupled to an opening on a housing 1220, 1320, or to the chamber 1250, 1350. Means for coupling can include preloading, soldering, mechanical attachments like screws or hooks, tabs, clips, or any other appropriate means.

In addition to the sound deadening qualities of a resonator or quarter wave tube, sound deadening materials may also be used. Sound deadening materials can be placed within the mixing chamber or the screen assembly, or the screen itself. For example, a mesh or screen can comprise sound deadening materials. Sound deadening materials can include coatings applied to other screens and meshes, plastics, ceramics, metal meshes, foams, vinyl materials, dimpled or other patterns formed into a material surface, textiles, glues or sealants, fiberglass, or other materials.

Figure 14:
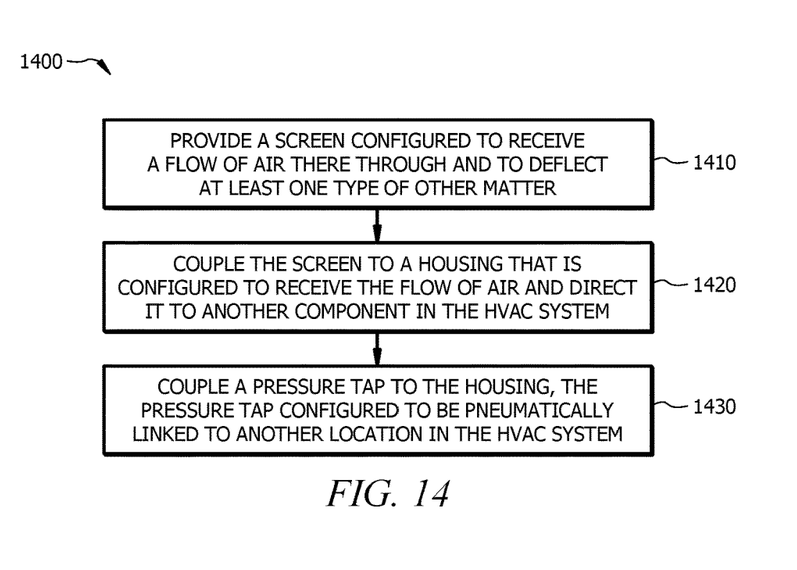
FIG. 14 is a flow chart diagram of a method embodiment under the present disclosure.
Figure 15:
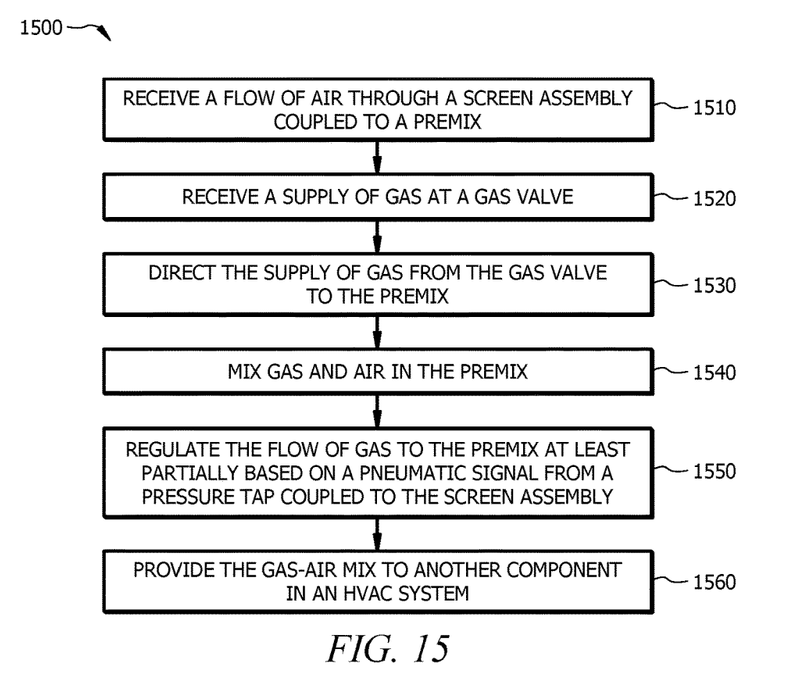
FIG. 15 is a flow chart diagram of a method embodiment under the present disclosure.

FIGS. 14 and 15 display possible method embodiments under the present disclosure. In embodiment 1400, at 1410, a screen is provided that is configured to receive a flow of air therethrough and to deflect at least one type of other matter. At 1420, the screen is coupled to a housing, the housing configured to receive the flow of air and direct it to another component in the HVAC system. At 1430, a pressure tap is coupled to the housing, the pressure tap configured to be pneumatically coupled to another location in the HVAC system.

FIG. 15 shows an embodiment 1500 for operating an HVAC system or furnace under the present disclosure. At 1510, a flow of air is received through a screen assembly coupled to a gas-air mixer. At 1520, a supply of gas is received at a gas valve. At 1530, the supply of gas is directed from the gas valve to the gas-air mixer. At 1540, the gas and air are mixed in the gas-air mixer. At 1550, the flow of gas to the gas-air mixer is regulated at least partially based on a pneumatic (or other type) signal from a pressure tap coupled to the screen assembly. At 1560, the gas-air mix is provided to another component in the HVAC system.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A premix assembly for use with a furnace in an HVAC system comprising:
   a mixing chamber operable to mix a supply of air and a supply of gas and to provide a gas-air mix to another component in the HVAC system;

a screen assembly coupled to the mixing chamber, operable to receive the supply of air from outside of the mixing chamber, and comprising:
- a screen on one end of the screen assembly operable to receive the supply of air therethrough and operable to deflect at least one type of foreign matter;
- a housing operable to couple with the screen and hold it in place, and configured to receive the supply of air and direct it into the mixing chamber;
- a pressure tap coupled to the housing and configured to be pneumatically coupled to another location in the HVAC system; and a gas valve configured to direct the supply of gas into the mixing chamber.

2. The premix assembly of claim 1 wherein the screen comprises a spherical shape.

3. The premix assembly of claim 1 wherein the housing and the screen are coupled by preloading at least a portion of the screen.

4. The premix assembly of claim 1 wherein the pressure tap is pneumatically coupled to the gas valve.

5. The premix assembly of claim 1 wherein the screen comprises a sound deadening material.

6. The premix assembly of claim 1 wherein the housing comprises a plastic.

7. The premix assembly of claim 1 wherein the screen comprises multiple layers.

8. The premix assembly of claim 1 wherein the screen assembly further comprises a Helmholtz resonator or a quarter-wave tube.

* * * * *